(12) United States Patent
Valentine et al.

(10) Patent No.: US 11,209,716 B2
(45) Date of Patent: Dec. 28, 2021

(54) HIGH-EFFICIENCY OPTICAL LIMITER USING METASURFACE AND PHASE-CHANGE MATERIAL

(71) Applicant: Vanderbilt University, Nashville, TN (US)

(72) Inventors: Jason G. Valentine, Nashville, TN (US); Richard F. Haglund, Nashville, TN (US); Zhihua Zhu, Nashville, TN (US); Austin Howes, Nashville, TN (US)

(73) Assignee: Vanderbuilt University, Nashville, TN (US)

( * ) Notice: Subject to any disclaimer, the term of this patent is extended or adjusted under 35 U.S.C. 154(b) by 140 days.

(21) Appl. No.: 16/593,551

(22) Filed: Oct. 4, 2019

(65) Prior Publication Data

US 2020/0117070 A1    Apr. 16, 2020

Related U.S. Application Data

(60) Provisional application No. 62/741,917, filed on Oct. 5, 2018.

(51) Int. Cl.
*G02F 1/35* (2006.01)
*G02F 1/355* (2006.01)

(52) U.S. Cl.
CPC .......... *G02F 1/3523* (2013.01); *G02F 1/3501* (2013.01); *G02F 1/3556* (2013.01); *G02F 1/3558* (2013.01); *G02F 1/3507* (2021.01); *G02F 1/3509* (2021.01); *G02F 2202/30* (2013.01); *G02F 2203/15* (2013.01); *G02F 2203/52* (2013.01)

(58) Field of Classification Search
None
See application file for complete search history.

(56) References Cited

U.S. PATENT DOCUMENTS 8,655,189 B2 * 2/2014 Almassy ............... G02F 1/19
                                                       398/201
9,627,840 B2 * 4/2017 Anantha ............. H01S 3/08059
10,178,735 B1 * 1/2019 Jankovic ................ C01G 31/02
(Continued)

OTHER PUBLICATIONS

Abb, Martina, et al. "All-optical control of a single plasmonic nanoantenna-ITO hybrid." Nano Letters 11.6 (2011): 2457-2463.
(Continued)

*Primary Examiner* — Rhonda S Peace
(74) *Attorney, Agent, or Firm* — Meunier Carlin & Curfman LLC

(57) ABSTRACT

According to some aspects, a transmissive and all-dielectric optical component/limiter with great cutoff efficiency using Vanadium Dioxide ($VO_2$) as the active component is disclosed. In some embodiments, Vanadium dioxide is used for an optical limiter due to the large contrast in optical constants upon undergoing the semiconductor to metal phase transition. When triggered optically, this transition occurs within 60 fs, making the device suitable for an ultrafast laser environment. In addition, the phase transition threshold is tunable by applying stress or doping; therefore, the device cutoff intensity can be adjusted to fulfill specific requirements.

18 Claims, 7 Drawing Sheets

(56) References Cited

U.S. PATENT DOCUMENTS

2018/0329273 A1* 11/2018 Rahmani .................. G02F 1/37
2020/0117070 A1*  4/2020 Valentine .............. G02F 1/3501

OTHER PUBLICATIONS

Abdollahramezani, Sajjad, et al. "Dynamic dielectric metasurfaces incorporating phasechange material." CLEO: Science and Innovations. Optical Society of America, 2018.
Alu, Andrea, et al. "Epsilon-near-zero metamaterials and electromagnetic sources: Tailoring the radiation phase pattern." Physical Review B 75.15 (2007): 155410.
Arbabi, Amir, et al. "Dielectric metasurfaces for complete control of phase and polarization with subwavelength spatial resolution and high transmission." Nature Nanotechnology 10.11 (2015): 937.
Arbabi,Ehsan, etal. "MEMS-tunable dielectric metasurface lens." Nature Communications 9.1 (2018): 812.
Arezoomandan, Sara, et al. "Graphene-dielectric integrated THz metasurfaces." Semiconductor Science and Technology (2018).
Bakker, Reuben M., et al. "Magnetic and electric hotspots with silicon nanodimers." Nano Letters 15.3 (2015): 2137-2142.
Bao Q., et al. "Graphene nanobubbles: a new optical nonlinear material." Advanced Optical Materials, 3.6 (2015): 744-749.
Barber, D. J., and Ian C. Freestone. "An investigation of the origin of the colour of the Lycurgus Cup by analytical transmission electron microscopy." Archaeometry 32.1 (1990): 33-45.
Barnard, Edward S., et al. "Spectral properties of plasmonic resonator antennas." Optics Express 16.21 (2008): 16529-16537.
Berglund, C. N., and H. J. Guggenheim. "Electronic properties of VO2 near the Semiconductor-Metal Transition." Physical Review 185.3 (1969): 1022.
Beteille, F., and J. Livage. "Optical switching in VO2 thin films." Journal of Sol-Gel Science and Technology 13.1-3 (1998): 915-921.
Bohn, Justus, et al. "Active tuning of spontaneous emission by Mie-resonant dielectric metasurfaces." Nano Letters 18.6 (2018): 3461-3465.
Boltasseva, Alexandra, and Harry A. Atwater. "Low-loss plasmonic metamaterials." Science 331.6015 (2011): 290-291.
Borneman J. D. "Optical metamaterials: linear and nonlinear characterization and application to optical limiting[D]". Purdue University, 2010.
Braun, Johannes M., et al. "Ultrafast response of photoexcited carriers in VO2 at highpressure." New Journal of Physics 20.8 (2018): 083003.
Case, Francine C. "Crystallographic transition in conventional bronze and anomalous blue VO2 thin films." Applied Optics 28.14 (1989): 2731-2735.
Chen, Chi-Fan, et al. "Controlling inelastic light scattering quantum pathways in graphene." Nature 471.7340 (2011): 617-620.
Chen, Hou-Tong, et al. "Active terahertz metamaterial devices." Nature 444.7119 (2006): 597.
Chen, Tao, Suyan Li, and Hui Sun. "Metamaterials application in sensing." Sensors 12.3 (2012): 2742-2765.
Cho, David J ., et al. "Ultrafast optical modulation of optical metamaterials." Optics Express 17.20 (2009): 17652-17657.
Coppens, Zachary J., Ivan I. Kravchenko, and Jason G. Valentine. "Lithography-free largearea metamaterials for stable thermophotovoltaic energy conversion." Advanced Optical Materials 4.5 (2016): 671-676.
Crozier, K. B., et al. "Optical antennas: Resonators for local field enhancement." Journal of Applied Physics 94.7 (2003): 4632-4642.
Cueff, S., et al. "Dynamic control of light emission faster than the lifetime limit using VO2 phase-change" Nature Communication 6(2015): 8636.
Currie, Marc, Michael A. Mastro, and Virginia D. Wheeler. "Characterizing the tunable refractive index of vanadium dioxide." Optical Materials Express 7.5 (2017): 1697-1707.
Decker, Manuel, et al. "High-efficiency dielectric Huygens' surfaces." Advanced Optical Materials 3.6 (2015): 813-820.
Dicken, Matthew J., et al. "Frequency tunable near-infrared metamaterials based on V02 phase transition." Optics Express 17.20 (2009): 18330-18339.
Donev, E. U., et al. "Size effects in the structural phase transition of VO2 nanoparticles studied by surface-enhanced Raman scattering." Journal of Optics A: Pure and Applied Optics 11.12 (2009): 125002.
Driscoll, Tom, et al. "Memory metamaterials." Science 325.5947 (2009): 1518-1521.
Edwards, Brian, et al. "Experimental verification of epsilon-near-zero metamaterial coupling and energy squeezing using a microwave waveguide." Physical Review Letters 100.3 (2008): 033903.
Ee, Ho-Seok, and Ritesh Agarwal. "Tunable metasurface and flat optical zoom lens on a stretchable substrate." Nano Letters 16.4 (2016): 2818-2823.
Ehrlich, J. E., et al. "Two-photon absorption and broadband optical limiting with bisdonor stilbenes." Optics Letters 22.24 (1997): 1843-1845.
Emani, Naresh K., et al. "Electrical modulation of Fano resonance in plasmonic nanostructures using grthene." Nano Letters 14.1 (2013): 78-82.
Emani, Naresh K., et al. "Electrically tunable damping of plasmonic resonances with graphene." Nano Letters 12.10 (2012): 5202-5206.
Esfandyarpour, Majid, et al. "Metamaterial mirrors in optoelectronic devices." Nature Nanotechnology 9.7 (2014): 542.
Fan, Kebin, and Willie J. Padilla. "Dynamic electromagnetic metamaterials." Materials Today 18.1 (2015): 39-50.
Farahani, Javad N., et al. "Single quantum dot coupled to a scanning optical antenna: a tunable superemitter." Physical Review Letters 95.1 (2005): 017402.
Ferrara, Davon W., et al. "Plasmonic probe of the semiconductor to metal phase transition in vanadium dioxide." Nano Letters 13.9 (2013): 4169-4175.
Forouzmand, Ali, et al. "A tunable multigate indium-tin-oxide-assisted all-dielectric metasurface." Advanced Optical Materials 6.7 (2018): 1701275.
Freestone, Ian, et al. "The Lycurgus cup—a roman nanotechnology." Gold Bulletin 40.4 (2007): 270-277.
Gao, Yanfeng, et al. "Nanoceramic VO2 thermochromic smart glass: A review on progress in solution processing." Nano Energy 1.2 (2012): 221-246.
Govyadinov, Alexander A., and Viktor A. Podolskiy. "Metamaterial photonic funnels for subdiffraction light compression and propagation." Physical Review B 73.15 (2006): 155108.
Green, Martin A., and Supriya Pillaj. "Harnessing plasmonics for solar cells." Nature Photonics 6.3 (2012): 130.
Grober, Robert D., Robert J. Schoelkopf, and Daniel E. Prober. "Optical antenna: towards a unity efficiency near-field optical probe." Applied Physics Letters 70.11 (1997): 1354-1356.
Guerin, Samuel, et al. "Synthesis and screening of phase change chalcogenide thin film materials for data storage." ACS Combinatorial Science 19.7 (2017): 478-491.
Gutruf, Philipp, et al. "Mechanically tunable dielectric resonator metasurfaces at visible frequencies." ACS Nano 10(1): 133-141 (2015).
Haverkort, M. W., et al. "Orbital-assisted metal-insulator transition in VO2." Physical Review Letters 95.19 (2005): 196404.
He, Guang S., et al. "Two-photon absorption and optical-limiting properties of novel organic compounds." Optics Letters 20.5 (1995): 435-437.
He, Xinfeng, et al. "In situ atom scale visualization of domain wall dynamics in VO2 insulator-metal phase transition." Scientific Reports 4 (2014): 6544.
Holloway, Christopher L., et al. "A double negative (DNG) composite medium composed of magnetodielectric spherical particles embedded in a matrix." IEEE Transactions on Antennas and Propagation 51.10 (2003): 2596-2603.
Howes, Austin, et al. "Dynamic transmission control based on all-dielectric Huygens metasurfaces." Optica 5.7 (2018): 787-792.
Hu, Shuren, et al. "Experimental realization of deep-subwavelength confinement in dielectric optical resonators." Science Advances 4.8 (2018): eaat2355.

(56) References Cited

OTHER PUBLICATIONS

Huang, Xueqin, et al. "Dirac cones induced by accidental degeneracy in photonic crystals and zero-refractive-index materials." Nature Materials 10.8 (2011): 582.
Huang, Yao-Wei, et al. "Gate-tunable conducting oxide metasurfaces." Nano Letters 16.9 (2016): 5319-5325.
Huang, Zhangli, et al. "Infrared characteristics of VO2 thin films for smart window and laser protection applications." Applied Physics Letters 101.19 (2012): 191905.
Iyer, P. P., et al. "Ultrawide thermal free-carrier tuning of dielectric antennas coupled to epsilon-near-zero substrates." Nature Communication 8.1(2017), 472.
Jacob, Zubin, Leonid V. Alekseyev, and Evgenii Narimanov. "Optical hyperlens: far-field imaging beyond the diffraction limit." Optics Express 14.18 (2006): 8247-8256.
Jahani, Saman, and Zubin Jacob. "All-dielectric metamaterials." Nature Nanotechnology 11.1 (2016): 23.
Jiang, Li-Hua, et al. "Tunable terahertz filters based on graphene plasmonic all-dielectric metasurfaces." Plasmonics 13.2 (2018): 525-530.
Johnson, Peter B., and R. W. Christy. "Optical constants of the noble metals." Physical Review B 6.12 (1972): 4370.
Jorgenson, G. V., & Lee, J.C. "Doped vanadium oxide for optical switching films." Solar Energy Materials 14 (3-5) (1986): 205-214.
Kang, B. et al. "Optical switching of near infrared light transmission in metamaterial-liquid crystal cell structure." Optics Express 18 (2010): 16492-16498.
Kannan, Ramamurthi, et al. "Toward highly active two-photon absorbing liquids. Synthesis and characterization of 1, 3, 5-triazine-based octupolar molecules." Chemistry of Materials 16.1 (2004): 185-194.
Karimzadeh, R., H. Aleali, and N. Mansour. "Thermal nonlinear refraction properties of Ag2S semiconductor nanocrystals with its application as a low power optical limiter." Optics Communications 284.9 (2011): 2370-2375.
Kats, Mikhail A., et al. "Ultra-thin perfect absorber employing a tunable phase change material." Applied Physics Letters 101.22 (2012): 221101.
Khorasaninejad, Mohammadreza, et al. "Metalenses at visible wavelengths: Diffractionlimited focusing and subwavelength resolution imaging." Science 352.6290 (2016): 1190-1194.
Khurgin, Jacob B. "How to deal with the loss in plasmonics and metamaterials." Nature Nanotechnology 10.1 (2015): 2.
Kim, Hyun-Tak, et al. "Mechanism and observation of Mott transition in VO2-based two-and three-terminal devices." New Journal of Physics 6.1 (2004): 52.
Kim, Minseok, et al. "Vanadium-dioxide-assisted digital optical metasurfaces for dynamic wavefront engineering." JOSA B 33.5 (2016): 980-988.
Kim, Seungchul, et al. "High-harmonic generation by resonant plasmon field enhancement." Nature 453.7196 (2008): 757.
Kivshar, Yuri, and Andrey Miroshnichenko. "Meta-optics with Mie resonances." Optics and Photonics News 28.1 (2017): 24-31.
Kivshar, Yuri. "All-dielectric meta-optics and non-linear nanophotonics." National Science Review 5.2 (2018): 144-158.
Kolobov, Alexander V., et al. "Understanding the phase-change mechanism of rewritable optical media." Nature Materials 3.10 (2004): 703.
Komar, Andrei, et al. "Dynamic beam switching by liquid crystal tunable dielectric metasurfaces." ACS Photonics 5.5 (2018): 1742-1748.
Komar, Andrei, et al. "Electrically tunable all-dielectric optical metasurfaces based on liquid crystals." Applied Physics Letters 110.7 (2017): 071109.
Kozen, Alexander C., et al. "Structural characterization of atomic layer deposited vanadium dioxide." The Journal of Physical Chemistry C 121.35 (2017): 19341-19347.
Kubytskyi, Viacheslav, Svend-Age Biehs, and Philippe Ben-Abdallah. "Radiative bistability and thermal memory." Physical Review Letters 113.7 (2014): 074301.
Kumar, Sunil, Francis Maury, and Naoufal Bahlawane. "Electrical switching in semiconductor-metal self-assembled VO2 disordered metamaterial coatings." Scientific Reports 6 (2016): 37699.
Lankhorst, Martijn HR, Bas WSMM Ketelaars, and Robertus AM Wolters. "Low-cost and nanoscale non-volatile memory concept for future silicon chips." Nature Materials 4.4 (2005): 347.
Lazarovits, Bence, et al. "Effects of strain on the electronic structure of VO2." Physical Review B 81.11 (2010): 115117.
Lee, C. C., et al. "Broadband graphene electro-optic modulators with sub-wavelength thickness." Optics Express 20.5 (2012): 5264-5269.
Lewin, L. "The electrical constants of a material loaded with spherical particles." Journal of the Institution of Electrical Engineers—Part III: Radio and Communication Engineering 94.27 (1947): 65-68.
Li, Peining, et al. "Reversible optical switching of highly confined phonon-polaritons with an ultrathin phase-change material." Nature Materials 15.8 (2016): 870.
Li, W., et al. "Ultrafast all-optical graphene modulator." Nano Letters, 14.2(2014):955-959.
Li, Wei, and Jason G. Valentine. "Harvesting the loss: surface plasmon-based hot electron photodetection." Nanophotonics 6.1 (2017): 177.
Li, Wei, and Jason Valentine. "Metamaterial perfect absorber based hot electron photodetection." Nano Letters 14.6 (2014): 3510-3514.
Liang, Jiran, et al. "Room temperature CH4 sensing properties of Au decorated VO2 nanosheets." Materials Letters 184 (2016): 92-95.
Lim G. K., et al. "Giant broadband nonlinear optical absorption response in dispersed graphene single ::iheets." Nature Photonics 5.9 (2011): 554-560.
Lin H. B., Tonucci R. J., Campillo A. J. "Two-dimensional photonic bandgap optical limiter in the visible." Optics Letters 23.2 (1998): 94-96.
Liu, et al. "Hybrid metamaterials for electrically triggered multifunctional control." Nature Communication 7 (2016): 13236.
Liu, K., et al. "Giant-amplitude, high-work density microactuators with phase transition activated nanolayer bimorphs." Nano Letters 12.12 (2012): 6302-6308.
Liu, M., et al. "A graphene-based broadband optical modulator." Nature, 74.7349 (2011): 64-67.
Liu, Mengkun, et al. "Terahertz-field-induced insulator-to-metal transition in vanadium dioxide metamaterial." Nature 487.7407 (2012): 345.
Liu, Sheng, et al. "Optical magnetic mirrors without metals." Optica 1.4 (2014): 250-256.
Liu, Tingting, et al. "Active control of electromagnetically induced transparency analogue in all-dielectric metamaterials loaded with graphene." arXiv preprint arXiv: 1808.07242 (2018).
Liu, Yongmin, and Xiang Zhang. "Metamaterials: a new frontier of science and technology." Chemical Society Reviews 40.5 (2011): 2494-2507.
Liu, Zhaowei, et al. "Far-field optical hyperlens magnifying sub-diffraction-limited objects." Science 315.5819 (2007): 1686-1686.
Lohmuller, T., et al. "Single molecule tracking on supported membranes with arrays of opticalnanoantennas." Nano Letters 12.3 (2012): 1717-1721.
Lopez, Rene, et al. "Size effects in the structural phase transition of VO2 nanoparticles." Physical Review B 65.22 (2002): 224113.
Lopez, Rene, Leonard C. Feldman, and Richard F. Haglund Jr. "Size-dependent optical properties ofVO2 nanoparticle arrays." Physical Review Letters 93.17 (2004): 177403.
MacChesney, J.B., & Guggenheim, H.J. "Growth and electrical properties of vanadium dioxide single crystals containing selected impurity ions." Journal of Physics and Chemistry of Solids 30.2 (1969): 225-234.
Markov, Petr, et al. "Optically monitored electrical switching in VO2." ACS Photonics 2.8 (2015): 1175-1182.
Marques, Ricardo, et al. "Comparative analysis of edge-and broadside-coupled split ring resonators for metamaterial design-theory and experiments." IEEE Transactions on Antennas and Propagation 51.10 (2003): 2572-2581.

(56) References Cited

OTHER PUBLICATIONS

Marvel, Robert E., et al. "Influence of deposition process and substrate on the phase transition of vanadium dioxide thin-films." Acta Materialia 91 (2015): 217-226.
Michel, Ann-Katrin U., et al. "Using low-loss phase-change materials for mid-infrared antenna resonance tuning." Nano Letters 13.8 (2013): 3470-3475.
Mie, Gustav. "Contributions to the optics of turbid media, particularly of colloidal metal solutions." Transl. into ENGLISH from Ann. Phys.(Leipzig), 25.3.1908 (1976):377-445.
Miller, Kevin J., et al. "Silicon waveguide optical switch with embedded phase change material." Optics Express 25.22 (2017): 26527-26536.
Miller, Kevin J., Richard F. Haglund, and Sharon M. Weiss. "Optical phase change materials in integrated silicon photonic devices." Optical Materials Express 8.8 (2018): 2415-2429.
Moitra, Parikshit, et al. "Experimental demonstration of a broadband all-dielectric metamaterial perfect reflector." Applied Physics Letters 104.17 (2014): 171102.
Moitra, Parikshit, et al. "Large-scale all-dielectric metamaterial perfect reflectors." ACS Photonics 2.6 (2015): 692-698.
Moitra, Parikshit, et al. "Realization of an all-dielectric zero-index optical metamaterial." Nature Photonics 7.10 (2013): 791.
Muehlschlegel, Peter, et al. "Resonant optical antennas." Science 308.5728 (2005): 1607-1609.
Muraoka, Y., and Z. Hiroi. "Metal-insulator transition of VO2 thin films grown on TiO2 and (110) substrates." Applied Physics Letters 80.4 (2002): 583-585.
Oh, Dong-Wook, et al. "Thermal conductivity and dynamic heat capacity across the metal-insulator transition in thin-film VO2." Applied Physics Letters 96.15 (2010): 151906.
Ollanik, Adam, et al. "Dynamically tunable, vanadium dioxide Huygens source metasurfaces." CLEO: QELS Fundamental Science. Optical Society of America, 2017.
Ou, Jun-Yu, et al. "An electromechanically reconfigurable plasmonic metamaterial operating in the near-infrared." Nature Nanotechnology 8.4 (2013): 252-255.
Ou, Jun-Yu, et al. "Reconfigurable photonic metamaterials." Nano Letters 11.5 (2011): 2142-2144.
Oulton, Rupert F., et al. "Plasmon lasers at deep subwavelength scale." Nature 461.7264 (2009): 629.
Pan, Mei, et al. "Raman study of the phase transition in VO2 thin films." Journal of Crystal Growth 268.1-2 (2004): 178-183.
Parry, Matthew, et al. "Active tuning of high-Q dielectric metasurfaces." Applied Physics Letters 111.5 (2017): 053102.
Pendry, John B., et al. "Magnetism from conductors and enhanced nonlinear phenomena." IEEE Transactions on Microwave Theory and Techniques 47.11 (1999): 2075-2084.
Peng, Xiao-Yu, et al. "Active near infrared linear polarizer based on VO2 phase transition." Journal of Applied Physics 114.16 (2013): 163103.
Pfeiffer, Carl, and Anthony Grbic. "Metamaterial Huygens' surfaces: tailoring wave fronts with reflectionless sheets." Physical Review Letters 110.19 (2013): 197401.
Phare, Christopher T., et al. "Graphene electro-optic modulator with 30 GHz bandwidth." Nature Photonics 9 (8) (2015): 511-514.
Piper, Jessica R., and Shanhui Fan. "Total absorption in a graphene monolayer in the optical regime by critical coupling with a photonic crystal guided resonance." ACS Photonics 1.4 (2014): 347-353.
Ponget, J.P., et al. "Dimerization of a linear Heisenberg chain in the insulating phases of V1-xCrx02." Physical Review B 10.5 (1974): 1801.
Pouget, J.P., et al. "Electron localization induced by uniaxial stress in pure VO2." Physical Review Letters 35.13 (1975): 873.
Rahmani, Mohsen, et al. "Reversible thermal tuning of all—dielectric metasurfaces." Advanced Functional Materials 27.31 (2017): 1700580.
Roxworthy, Brian J., et al. "Reconfigurable nanoantennas using electron-beam manipulation." Nature Communications 5 (2014): 4427.
Salandrino, Alessandro, and Nader Engheta. "Far-field subdiffraction optical microscopy using metamaterial crystals: Theory and simulations." Physical Review B 74.7 (2006): 075103.
Sautter, Jurgen, et al. "Active tuning of all-dielectric metasurfaces." ACS Nano 9.4 (2015): 4308-4315.
Schuck, P.J., et al. "Improving the mismatch between light and nanoscale objects with gold bowtie nanoantennas." Physical Review Letters 94.1 (2005): 017402.
Schuller, Jon A., et al. "Plasmonics for extreme light concentration and manipulation." Nature Materials 9.3 (2010): 193.
Semouchkina, Elena, et al. "Sensing based on Fano-type resonance response of all-dielectric metamaterials." Sensors 15.4 (2015): 9344-9359.
Shcherbakov, Maxim R., et al. "Ultrafast all-optical tuning of direct-gap semiconductor metasurfaces." Nature Communication 8 (2017).17.
Shelby, Richard A., David R. Smith, and Seldon Schultz. "Experimental verification of a negative index of refraction." Science 292.5514 (2001): 77-79.
Shrekenhamer, David, Wen-Chen Chen, and Willie J. Padilla. "Liquid crystal tunable metamaterial absorber." Physics Review Letters 110.17 (2013): 177403.
Simo, Aline, et al. "VO2 nanostructures based chemiresistors for low power energy consumption hydrogen sensing." International Journal of Hydrogen Energy 39.15 (2014): 8147-8157.
Simpson, R. E., et al. "Interfacial phase-change memory." Nature Nanotechnology 6.8 (2011): 501.
Slovick, Brian A., et al. "Metasurface polarization splitter." Phil. Trans. R. Soc. A 375.2090 (2017): 20160072.
Stefanovich, G., A. Pergament, and D. Stefanovich. "Electrical switching and Mott transition in VO2." Journal of Physics: Condensed Matter 12.41 (2000): 8837.
Sterl, Florian, et al. "Magnesium as novel material for active plasmonics in the visible wavelength range." Nano Letters 15.12 (2015): 7949-7955.
Stewart, Matthew E., et al. "Nanostructured plasmonic sensors." Chemical Reviews 108.2 (2008): 494-521.
Strelcov, Evgheni, Yigal Lilach, and Andrei Kolmakov. "Gas sensor based on metal-insulator transition in VO2 nanowire thermistor." Nano Letters 9.6 (2009): 2322-2326.
Su, Zhaoxian, et al. "Electrically tunable metasurface based on Mie-type dielectric resonators." Scientific Reports 7 (2017): 43026.
Sun, Shang, et al. "Real-time tunable colors from microfluidic reconfigurable all-dielectric metasurfaces." ACS Nano 12.3 (2018): 2151-2159.
Tadjer, Marko J., et al. "Temperature and electric field induced metal-insulator transition in atomic layer deposited VO2 thin-films." Solid-State Electronics 136 (2017): 30-35.
Tao, Hu, et al. "MEMS based structurally tunable metamaterials at terahertz frequencies." Journal of Infrared, Millimeter, and Terahertz Waves 32.5 (2011): 580-595.
Thornton, John A., and D. W. Hoffman. "Stress-related effects in thin films." Thin Solid Films 171.1 (1989): 5-31.
Tian, Jingyi, et al. "Reconfigurable all-dielectric antenna-based metasurface driven by multipolar resonances." Optics Express 26.18 (2018): 23918-23925.
Tittl, Andreas, et al. "A switchable mid-infrared plasmonic perfect absorber with multispectral thermal imaging capability." Advanced Materials 27.31 (2015): 4597-4603.
Vassant, Simon, et al. "Berreman mode and epsilon near zero mode." Optics Express 20.21 (2012): 23971-23977.
Vassant, Simon, et al. "Epsilon-near-zero mode for active optoelectronic devices." Physical Review Letters 109.23 (2012): 237401.
Verleur, Hans W., A. S. Barker Jr, and C. N. Berglund. "Optical properties ofVO2 between 0.25 and 5 eV." Physical Review 172.3 (1968): 788.
Wang, Dacheng, et al. "Switchable ultrathin quarter-wave plate in terahertz using active phase-change metasurface." Scientific Reports 5 (2015): 15020.
Wang, H., Yang, Y., & Wang, L. "Switchable wavelength-selective and diffuse metamaterial absorber/emitter with a phase transition spacer layer." Applied Physics Letters 105.7 (2014): 071907.

(56) References Cited

OTHER PUBLICATIONS

Wang, Hongchen, Xinjian Yi, and Yi Li. "Fabrication of VO2 films with low transition temperature for optical switching applications." Optics Communications 256.4-6 (2005): 305-309.
Wang, Lei, Shu-Ren Lu, and Jing Wen. "Recent advances on neuromorphic systems using phase-change materials." Nanoscale Research Letters 12.1 (2017): 347.
Wang, Qian, et al. "Optically reconfigurable metasurfaces and photonic devices based on phase change materials." Nature Photonics 10.1 (2016): 60.
Wang, Wenyi, et al. "Enhanced absorption in two-dimensional materials via Pano-resonant photonic crystals." Applied Physics Letters 106.18 (2015): 181104.
Wang, Wenyi, et al. "Hot electron-based near-infrared photodetection using bilayer MoS2." Nano Letters 15.11 (2015): 7440-7444.
Wang, Xi, et al. "All-solid-state tunable Bragg filters based on a phase transition material." CLEO.—Science and Innovations. Optical Society of America, 2017.
Wang, Yang, et al. "Metamaterial-plasmonic absorber structure for high efficiency amorphous silicon solar cells." ijano Letters 12.1 (2011): 440-445.
Wegkamp, Daniel, et al. "Instantaneous band gap collapse in photoexcited monoclinic VO2 due to photocarrier doping." Physical Review Letters 113.21 (2014): 216401.
Wen, Haidan, et al. "Structural and electronic recovery pathways of a photoexcited ultrathin VO2 film." Physical Review B 88.16 (2013): 165424.
Westlund, Robert, et al. "Click chemistry for photonic applications: triazolefunctionalized platinum (II) acetylides for optical power limiting." Journal of Materials Chemistry 18.2 (2008): 166-175.
Wu, Chihhui, et al. "Spectrally selective chiral silicon metasurfaces based on infrared Fano resonances." Nature Communications 5 (2014): 3892.
Wurtz, Gregory A., et al. "Designed ultrafast optical nonlinearity in a plasmonic nanorod metamaterial enhanced by nonlocality." Nature Nanotechnology 6.2 (2011): 107.
Wuttig, Matthias, and Noboru Yamada. "Phase-change materials for rewriteable data storage." Nature Materials 6.11 (2007): 824.
Xiao, S. M. et al. "Tunable magnetic response of metamaterials." Applied Physics Letters (2009): 033115.
Xiao, Shumin, et al. "Loss-free and active optical negative-index metamaterials." Nature 466.7307 (2010): 735
Yamin, Tony, Yakov M. Strelniker, and Amos Sharoni. "High resolution Hall measurements across the V02 metal-insulator transition reveal impact of spatial Phase separation." Scientific Reports 6 (2016): 19496.

Yang, Yuanmu, et al. "All-dielectric metasurface analogue of electromagnetically induced transparency." Nature Communications 5 (2014): 5753.
Yang, Yuanmu, et al. "Dielectric meta-reflectarray for broadband linear polarization conversion and optical vortex generation." Nano Letters 14.3 (2014): 1394-1399.
Yang, Yuanmu, et al. "Modulating the fundamental inductive-capacitive resonance in asymmetric double-split ring terahertz metamaterials." Applied Physics Letters 98.12 (2011): 121114.
Yang, Yuanmu, et al. "Nonlinear Pano-resonant dielectric metasurfaces." Nano Letter 15.11 (2015): 7388-7393.
Yang, Zheng, Changhyun Ko, and Shriram Ramanathan. "Oxide electronics utilizing ultrafast metal-insulator transitions." Annual Review of Materials Research 41 (2011): 337-367.
Yoon, Junho, et al. "Broadband epsilon-near-zero perfect absorption in the near-infrared." Scientific Reports 5 (2015): 12788.
Zhang, Dong-ping, et al. "High performance VO2 thin films growth by DC magnetron sputtering at low temperature for smart energy efficient window application." Journal of Alloys and Compounds 659 (2016): 198-202.
Zhang, Hai-Tian, et al. "Wafer-scale growth of VO2 thin films using a combinatorial approach." Nature Communications 6 (2015): 8475.
Zhang, Shuang, et al. "Photoinduced handedness switching in terahertz chiral metamolecules." Nature Communications 3 (2012): 942.
Zhang, Xiang, and Zhaowei Liu. "Superlenses to overcome the diffraction limit." Nature Materials 7.6 (2008): 435.
Zhao, Yanhui, et al. "Light-driven tunable dual-band plasmonic absorber using liquid-crystal-coated asymmetric nanodisk array." Applied Physics Letters 100.5 (2012): 053119.
Zheludev, Nikolay I., and Yuri S. Kivshar. "From metamaterials to metadevices." Nature Materials 11.11 (2012): 917.
Zheng, Jianyun, Shanhu Bao, and Ping Jin. "TiO2(R)NO2(M)/TiO2(A) multilayer film as smart window: Combination of energy-saving, antifogging and self-cleaning functions." Nano Energy 11 (2015): 136-145.
Zhou, You, et al. "Voltage-triggered ultrafast phase transition in vanadium dioxide switches." IEEE Electron Device Letters 34.2 (2013): 220-222.
Zhu, Zhihua, et al. "Broadband plasmon induced transparency in terahertz metamaterials." Nanotechnology 24.21 (2013): 214003.
Zhu, Zhihua, et al. "Dynamically reconfigurable metadevice employing nanostructured phase-change materials." Nano Letters 17.8 (2017): 4881-4885.

* cited by examiner

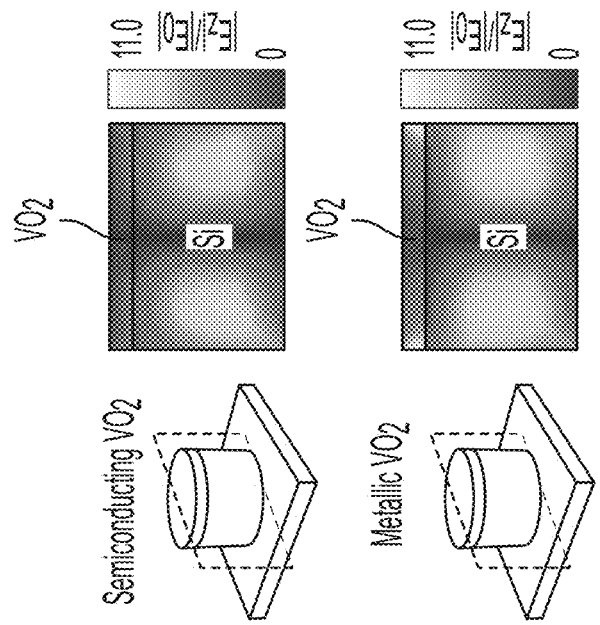
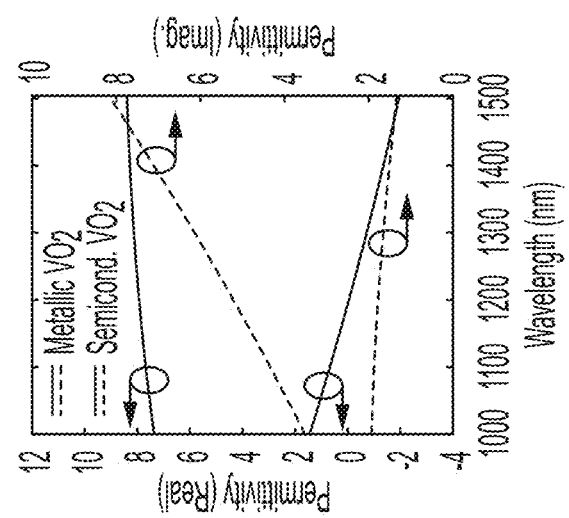
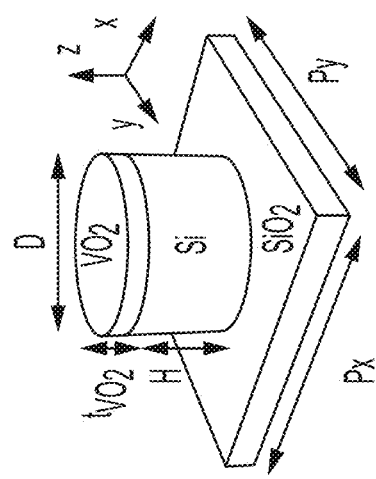
FIG. 1A
FIG. 1B
FIG. 1C

HIGH-EFFICIENCY OPTICAL LIMITER USING METASURFACE AND PHASE-CHANGE MATERIAL

CROSS REFERENCE TO RELATED APPLICATIONS

This application claims priority to and the benefit of U.S. Provisional Patent Application Ser. No. 62/741,917, filed Oct. 5, 2018, the contents of which is hereby incorporated by reference in its entirety.

STATEMENT REGARDING GOVERNMENT SUPPORT

This invention was made with government support under Grant Number N00014-16-1-2283 awarded by Office of Naval Research ("ONR"), under Grant No. ECCS1351334 awarded by National Science Foundation ("NSF"), and under Grant No. DE-FG02-01ER45916 awarded by the Department of Energy. The government has certain rights to this invention.

BACKGROUND

Field of the Endeavor

Embodiments of the present invention relate to optical devices, specifically tunable optical limiters based on metasurfaces.

Background

Optical limiters are intended to limit the intensity of light at high fluences. This is typically done to protect electronics or an individual's eyes from exposure to intense and damaging laser light. The demand for efficient power-limiting optical elements has accompanied the development of high-power lasers in order to meet safety requirements and eliminate potential damage on sensitive photodetectors, sensors, and cameras.

An optical limiter generally transmits low intensity light with a high transmission coefficient (e.g., in an on-state) and blocks high intensity light completely or maintains the transmission coefficient at a sufficiently low level (e.g., in an off-state). In the past few decades, most optical limiter designs have used two-photon absorption or excited state absorption in nonlinear media. These materials have been primarily studied as dilute suspensions and not as complete optical devices, hindering their integration in solid-state platforms for real applications. In addition, nonlinear materials films or suspensions face a tradeoff between the on-state transmission and cut-off contrast, as a thinner material possesses higher on-state transmission but is incapable of blocking light efficiently at the off-state.

One conventional way for achieving limiting is to use dyes that absorb light. However, these limiters suffer from relative high transmission in the high fluence state. They are also easily damaged by high fluence light. Another approach is to use a cavity with a nonlinear material inside it, but this approach can result in very strong limiting but suffers from a reflection band around the limiting wavelength. As such, this approach is only suitable for protecting cameras or sensors that have a very narrow wavelength range with which they operate across.

BRIEF SUMMARY

In accordance with the purpose(s) of this invention, as embodied and broadly described herein, this invention, in one aspect, relates to an optical limiter using metasurface and phase-change material.

It is to be understood that both the foregoing general description and the following detailed description are exemplary and explanatory only and are not restrictive of the invention as claimed.

BRIEF DESCRIPTION OF THE DRAWINGS

The accompanying figures, which are incorporated herein and form part of the specification, illustrate an optical device using metasurface and phase-change material. Together with the description, the figures further serve to explain the principles of the actively reconfigurable, hyperbolic metasurfaces described herein and thereby enable a person skilled in the pertinent art to make and use the optical device using metasurface and phase-change material.

FIG. 1A shows a schematic of an exemplary Huygens metasurface-based optical limiter according to principles described herein.

FIG. 1B shows measured permittivity of a 30 nm Vanadium Dioxide ($VO_2$) film on Si substrate at 25° C. and 85° C.

FIG. 1C shows an electric field distribution in the z direction.

DETAILED DESCRIPTION

Figure 1D:
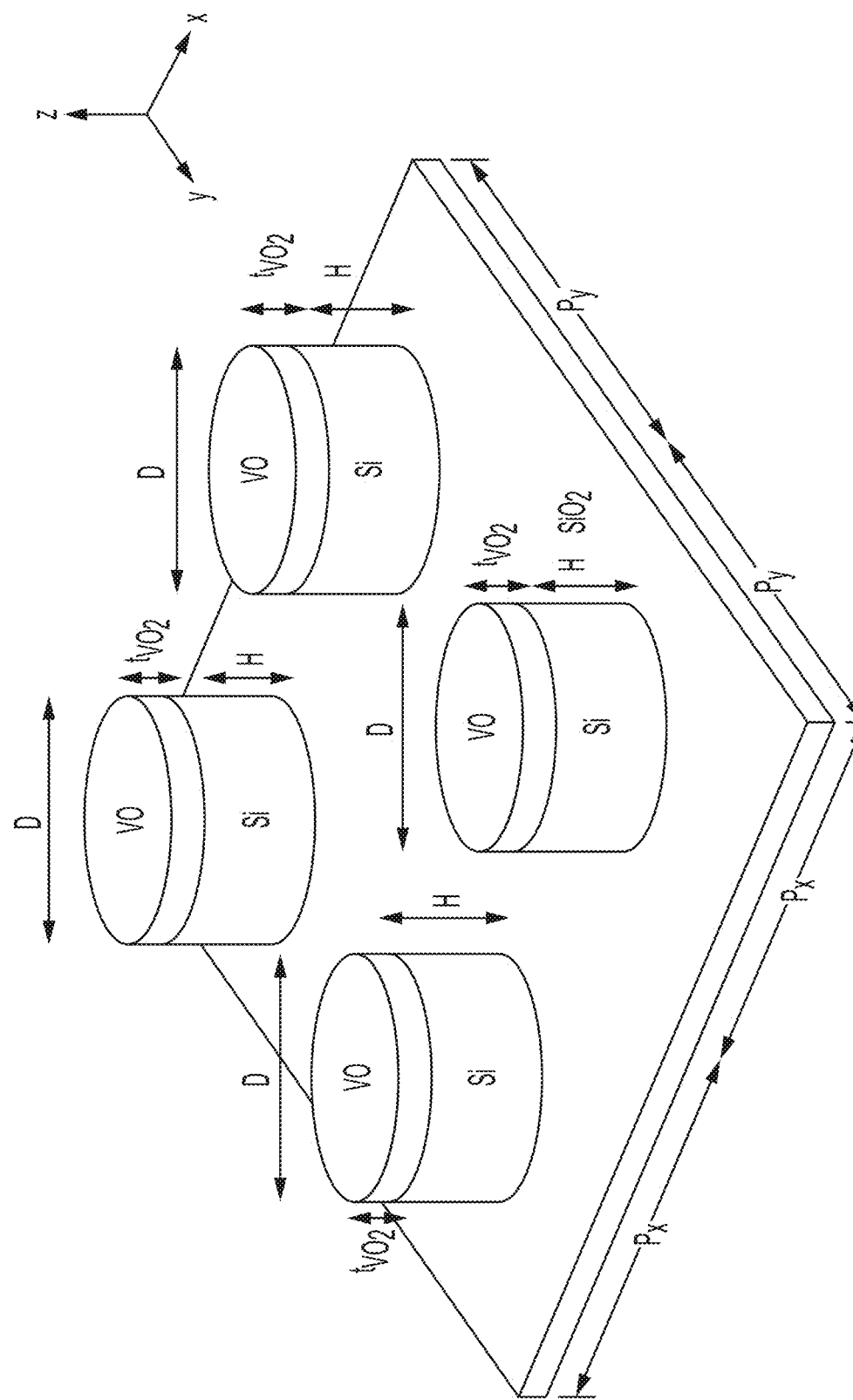
FIG. 1D shows multiple dielectric resonators on an insulating substrate.

Reference will now be made in detail to embodiments of the optimal limiter using a metasurface and phase-change material with reference to the accompanying figures. The same reference numbers in different drawings may identify the same or similar elements.

At low intensities, the light is intended to pass through an optical limiter so that it can be recorded or imaged. Optical limiters that that will cause the device to become reflective or absorptive once the light fluence reaches a certain threshold are desirable, but creating a device that achieves limiting, while also being highly transmissive at low fluences has proven challenging. In the past twenty years, metamaterials and two-dimensional metasurfaces have assisted in optical dispersion engineering and enhancing light-matter interaction in communications, bio-sensing, super-resolution imaging and energy harvesting. All-dielectric metamaterials are most suitable for transmissive optics due to the low loss when working below the dielectrics' bandgaps. This feature has been used in high-efficiency optical systems such as metalenses, optical power switches, and polarization filters, which are difficult to achieve with plasmonic nanostructures in the visible and near infrared wavelength regime. Optical modulators and polarizers using liquid crystals, ultrafast switches using direct-bandgap semiconductors and graphene, and tunable reflectors with phase-change materials have all been made by combining active materials with metasurfaces, but no practical optical limiter has been produced to date.

An optical limiter according to principles described herein includes a phase-change material on a resonator. An example optical limiter may be made by integrating a phase-change material such as Vanadium Dioxide ($VO_2$) with metamaterial all-dielectric nanostructures is described herein. In an optical limiter according to principles described herein, a Huygens metasurface may been implemented to get resonances with concentrated field distribution, as well as high on-state transmission $T_{on}$. Then, an epsilon-near-zero (ENZ) mode may be introduced to damp down the off-state transmission $T_{off}$.

An incident intensity cutoff point and the interrelationship between the performance and the volume of the $VO_2$ have been studied and analyzed to produce an example of the proposed optical limiter with an optimized aspect ratio (AR) of the all-dielectric resonators. As described herein, a working wavelength can be accommodated across the near infrared by scaling the geometric parameters. Implementation of an optical limiter according to principles described herein could reasonably lead to highly secured real-time detection and sensing with minimizing or managing overheating and damage.

In an aspect, according to principles described herein, a device having a periodic nanostructure array of silicon and $VO_2$ cylinders may be embedded in or on an insulating substrate, such as $SiO_2$. A schematic of an exemplary unit cell of such a nanostructure array is illustrated in FIG. 1A.

Dielectric resonators support resonant modes that are spectrally dependent on the dimensions of the structures. In an example, the lowest order Mie resonances, the electric dipole (ED) and magnetic dipole (MD) resonances may be spectrally overlapped at a resonance wavelength $\lambda_0$ of 1209 nm. At this wavelength, the reflected fields from the two dipole modes are out of phase with one another, resulting in zero (or substantially zero) reflected intensity and unity (or substantial unity) transmission. This unique combination of dipole modes is known as a Huygens metasurface, which may be incorporated in to an optical limiter, as described herein. The transmission efficiency of the optical limiter will depend on whether the $VO_2$ is in the semiconducting or metallic state and is expressed by $T=1-|Im(VO_2) \times E_{VO_2}^2)|$, where $Im(VO_2)$ and $E_{VO_2}^2$ are the imaginary part of the permittivity and electric field of the $VO_2$, respectively. From the measured permittivity given in FIG. 1B, the metallic phase $VO_2$ (at 85° C.) exhibits a larger imaginary permittivity than in the semiconducting state. This fulfills the basic requirement of an absorptive optical limiter—the device may be self-adjusted from on-state to off-state when the $VO_2$ material is heated up above the phase transition threshold through light absorption.

FIG. 1A shows a schematic of an exemplary Huygens metasurface-based optical limiter according to principles described herein. As illustrated, in the example device, the diameter of the cylinder is D=432 nm, the height of silicon h=180 nm and thickness of $VO_2$ $t_{VO_2}$=30 nm. The pitch p between each unit cell is substantially identical in both x and y directions, with p=640 nm in the present example device. FIG. 1B shows measured permittivity of 60 nm $VO_2$ film on Si substrate at 25° C. (black, completely semiconducting phase) and 85° C. (purple, completely metallic phase); in FIG. 1B the real part is plotted with solid curve and imaginary part plotted with dash curve. FIG. 1C shows an electric field distribution in the z direction in a simulated electric field. The electric field is normalized to the incident $E_{x0}$.

FIG. 1D shows multiple dielectric resonators on an insulating substrate. As shown, a plurality of dielectric resonator structures as described herein may be formed on an insulating substrate such as $SiO_2$, although the insulating substrate may be of any suitable material. Each dielectric resonator includes thereon a phase change material structure, wherein each phase change material structure has an optical property having a first characteristic associated with a first material phase and a second characteristic associated with a second material phase. The dielectric resonator structures are separated from each other by a pitch p. While shown as having four exemplary resonators on the insulating substrate, the optical device is not so limited and may be of any number of dielectric resonator structures separated by a pitch $p_x$ in a first direction and a pitch $p_y$ in a second direction. In some applications, the $p_x=p_y$. The first direction may be perpendicular to the second direction. Each of the resonator structures in the embodiment of FIG. 1D may be a dielectric resonator according to principles described herein. In addition, while illustrated as having dielectric resonators extending in both an x and a y direction, the design is not so limited and may include multiple resonators separated by a predetermined pitch.

To better suppress the transmission of the off-state, an epsilon-near-zero (ENZ) mode may introduced. According to electromagnetic boundary conditions, the displacement current will be continuous across the Si—$VO_2$ material interface, expressed by $\epsilon_{Si}E_{z\_Si}=\epsilon_{VO_2}E_{z\_VO_2}$. When the permittivity of $VO_2$ approaches zero, the electric field inside the $VO_2$ is enhanced to compensate. The $E_z$ field is given in FIG. 1C, which illustrates that an enhancement factor of 8 is obtained by incorporating the ENZ mode into the device.

Figure 2A:
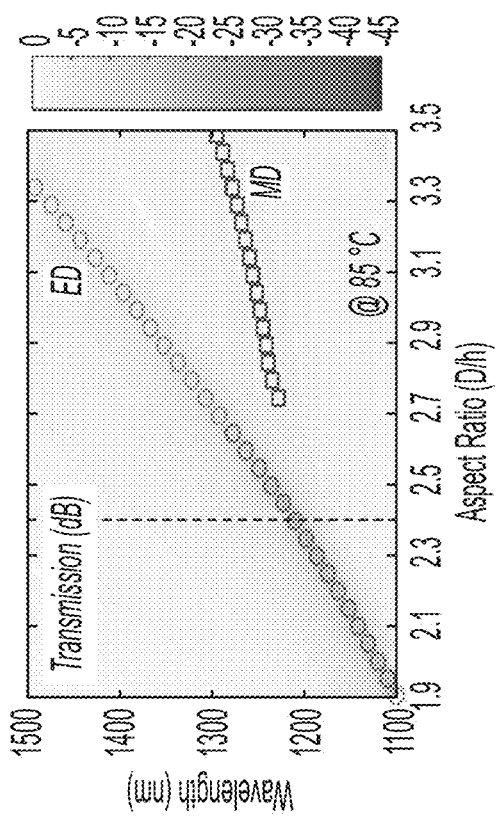
FIG. 2A shows aspect ratio (AR) of an exemplary device according to principles described herein at 25° C.
Figure 2B:
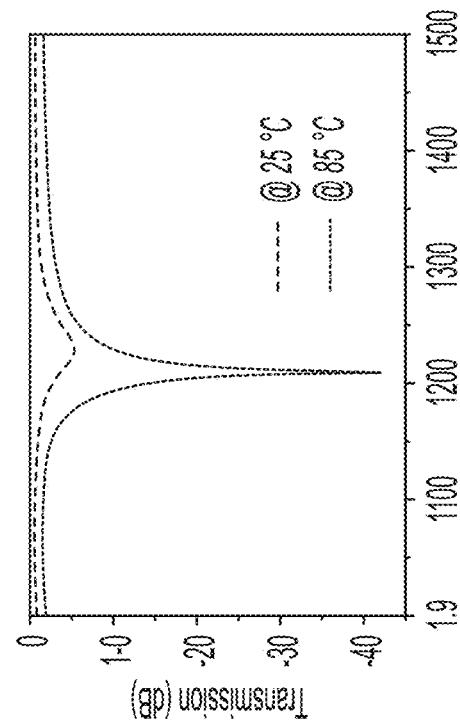
FIG. 2B shows aspect ratio (AR) of an exemplary device according to principles described herein at 85° C.
Figure 2C:
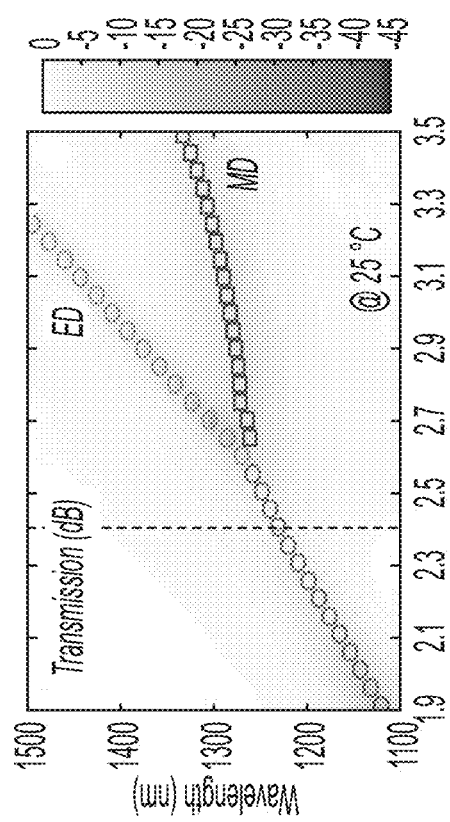
FIG. 2C shows transmission spectrum with AR=2.4.
Figure 2D:
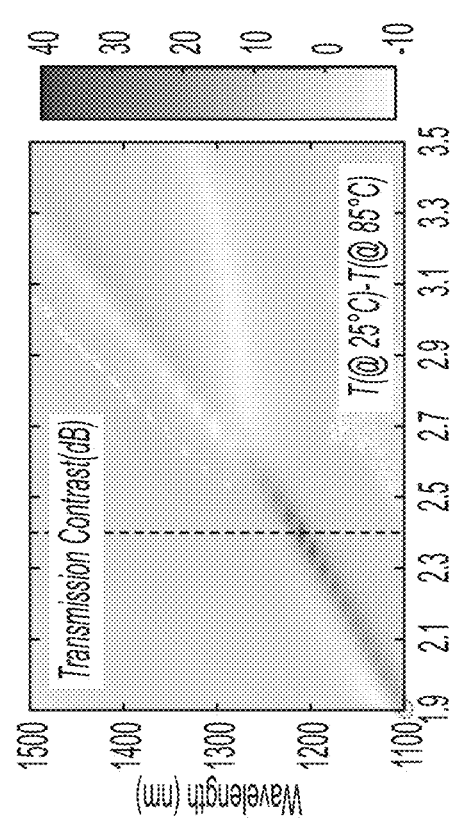
FIG. 2D shows transmission contrast between on-state and off-state with different AR.

The transmission of the device as a function of wavelength and aspect ratio (AR) are displayed in FIGS. 2A and 2B, which were simulated with commercial FDTD software-CST Microwave Studio. FIG. 2 shows calculated transmission of a Huygens metasurface-based optical limiter with different AR with semiconducting phase $VO_2$ in FIG. 2A and metallic phase $VO_2$ in FIG. 2B. A dashed line indicates of the optimized AR, and symbols are used to trace the fundamental resonant modes ED (electric dipole) and MD (magnetic dipole). FIG. 2C shows transmission spectra at AR=2.4. Black and gray solid lines refer to Huygens metasurface-based optical limiter with semiconducting and metallic $VO_2$ on the top, respectively. FIG. 2D shows transmission contrast between on-state and off-state with different AR.

The electric dipole (ED) and magnetic dipole (MD) resonance positions are initially spectrally separated, then gradually merge as the AR is decreased until they completely overlap at AR=2.4. Transmission spectra at AR=2.4 are plotted in FIG. 2C for better clarification. With this optimized AR, a high transmission of −3.6 dB is observed at the resonance wavelength of 1209 nm with semiconducting $VO_2$ on top (FIG. 2A) due to equal strength of the scattering cross sections of the two resonances. When $VO_2$ is heated and the transition to the metallic state occurs (FIG. 2B), the field enhancement in the $VO_2$ generates absorption, and is observed as a decrease in transmittance to −41.8 dB. The transmittance contrast between the on-state and the off-state is 38.2 dB. This large contrast is expected to be the optimal value, which can be determined from the transmission contrast mapping in FIG. 2D. If we continue to decrease the AR, the ED and MD should depart from each other, which is not discernable in the present dB plot.

To characterize the performance of the optical limiter and estimate the intensity threshold when it turns from on-state to off-state, a CST thermal solver is used here to calculate the mean temperature of the $VO_2$ nanoparticles, using material properties listed in Table 1, below, which shows the thermal property of the materials in the Huygens metasurface-based on optical limiter according to principles described herein.

TABLE 1

| Materials | Density (g/cm3) | Thermal Cond. (W/K · m) | Heat Capacity (kJ/K · kg) |
|---|---|---|---|
| Si | 2.328 | 1.5 | 0.71 |
| SiO2 | 2.4 | 1.4 | 0.75 |
| $VO_2$ (25° C.) | 4.57 | 3.5 | 0.656 |
| $VO_2$ (85° C.) | 4.64 | 6 | 0.78 |

Figures 3A, 3B:
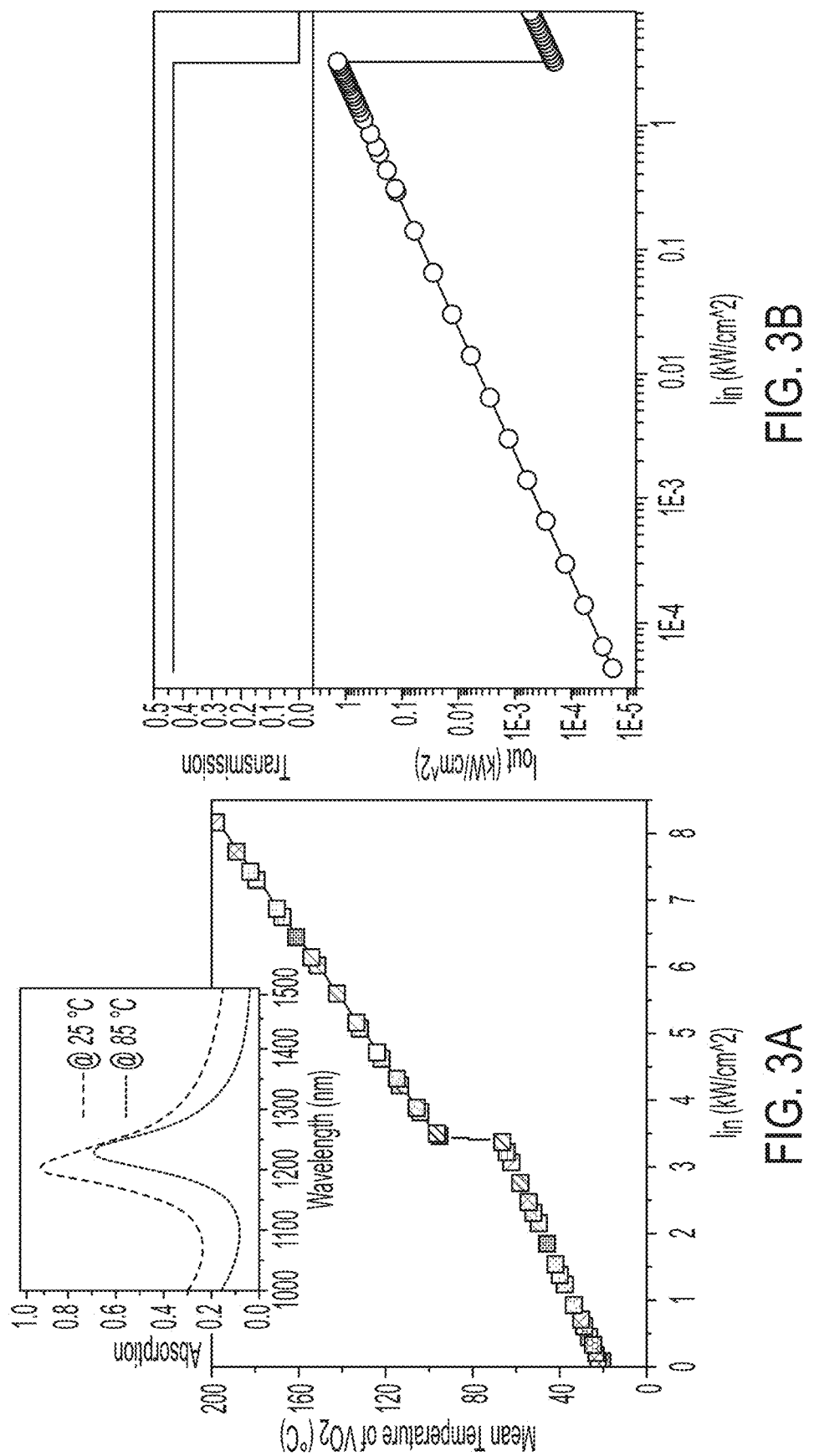
FIG. 3A shows a simulated mean temperature of the $VO_2$ nanostructure under different incident intensity.
FIG. 3B shows a nonlinear relation between the transmission of the optical limiter and input intensity (top panel), output intensity $I_{out}$ and input intensity $I_{in}$ (bottom panel).

FIG. 3A shows a simulated mean temperature of the $VO_2$ nanostructure under different incident intensity. FIG. 3B shows a nonlinear relation between the transmission of the optical limiter and input intensity (top panel), output intensity $I_{out}$ and input intensity $I_{in}$ (bottom panel). Assuming silicon and $SiO_2$ are both lossless, the injected power $Q = A \times I_{in} \times \alpha$ is entirely absorbed within the $VO_2$ nanoparticles, where A is the cross-sectional area of the unit cell, $I_{in}$ is the incident intensity, and $\alpha$ is the absorption of the device. The absorption at the semiconducting and metallic $VO_2$ state at $\lambda=1209$ nm is $\alpha_{25°C}=0.567$ and $\alpha_{85°C}=0.898$, respectively, as seen in FIG. 3A. The $VO_2$ film in the model is treated as a heat source that dissipates energy to its environment with an ambient air convection of 50 $W/m^2/K$. Adiabatic boundaries were used in the in-plane directions to mimic a periodic boundary condition. In the semiconducting phase, the mean temperature of $VO_2$ is heated to 67° C. at an incident intensity of 3.4 $kW/cm^2$ (FIG. 3A). Once the phase transition is triggered by an incident laser beam, the temperature will rise at a greater rate (include actual number here) due to the increased absorption, resulting in a drop in transmission (FIG. 3B). We observe a simulated decrease of 4 orders of magnitude in transmittance intensity $I_{out}$, as seen in FIG. 3B.

The intensity needed to activate the phase transition is around 3.4 $kW/cm^2$ per unit cell (FIG. 3A). For example, for a 20 μm×20 μm device array, the required beam power is 13.6 mW, which is consistent with the fluence needed for ultrafast $VO_2$ phase transition trigged by a femtosecond laser. This method requires less power to trigger the phase transition of $VO_2$ than thermal heating since the dielectric environment surrounding the film experiences nearly zero absorption losses. Therefore, substantially all the absorbed incident power is funneled into the $VO_2$ and more efficiently governs the material state than plasmonic metamaterials, in which metallic elements absorb a large amount of incident energy. In addition, metallic nanostructures possess a higher conductivity compared to dielectric environment in the present exemplary device, and exposure to air can also affect the thermal properties due to convection. FIG. 3A and FIG. 3B show simulated results.

The performance of the optical limiter is sensitive to the $VO_2$ active layer thickness. If the $VO_2$ is too thick, the on-state transmission may be reduced and the cutoff contrast harmed. If the $VO_2$ is too thin, there may not be enough material to suppress the off-state transmission, even with the electric field enhancement from the resonator underneath. Additionally, the ENZ mode behavior relies on the thickness of the ENZ material. To illustrate this combined consequence on how the $VO_2$ thickness affects the transmission and contrast, numerical simulations were performed with the same geometry as FIG. 1A, while varying the $VO_2$ thickness from 5 nm to 35 nm. The $VO_2$ thickness dependence plots in FIGS. 4A and 4B demonstrate that the metamaterial transmission first decreases with thicker $VO_2$. Different thicknesses of the metamaterial, such as $VO_2$ may be used to make an optical limiter according to principles described herein provided that the resulting characteristics are acceptable for the contemplated use.

Figures 4A, 4B, 4C:
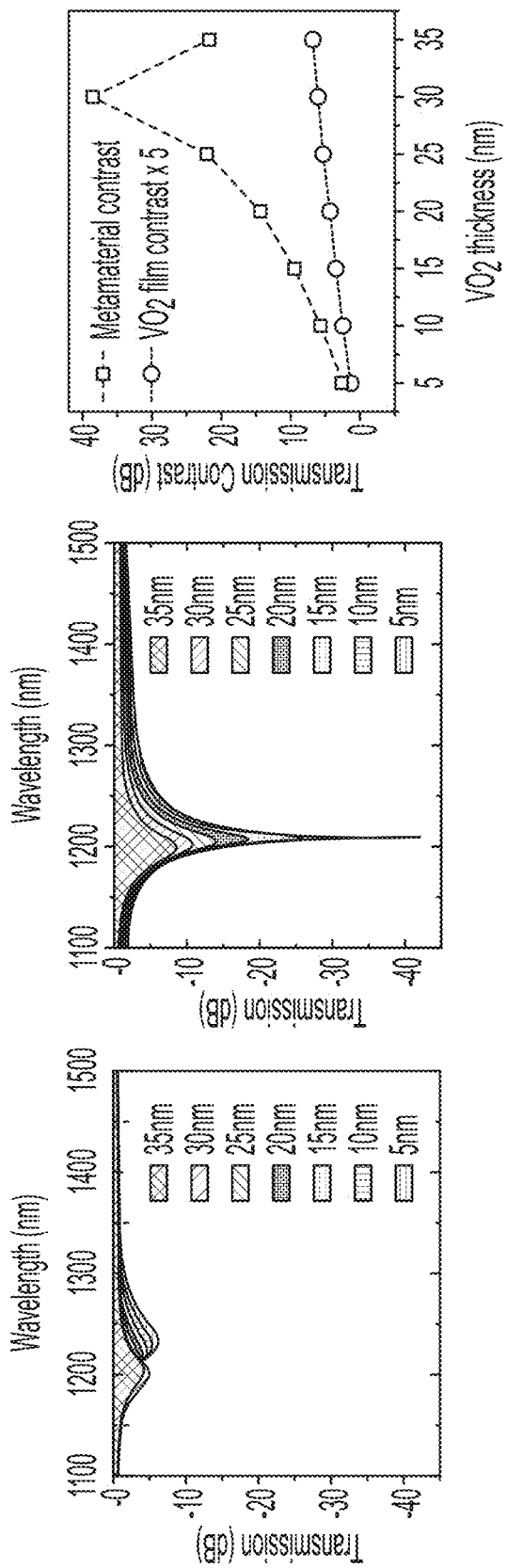
FIG. 4A shows a simulated transmission spectra with semiconducting phase $VO_2$ as a function of film thickness.
FIG. 4B shows a simulated transmission spectra with metallic phase $VO_2$.
FIG. 4C shows simulated transmission contrast with varying $VO_2$ thickness for the Huygens metasurface-based optical limiter (solid square) and $VO_2$ continuous film on $SiO_2$ substrate (solid circle).
Figure 5A:
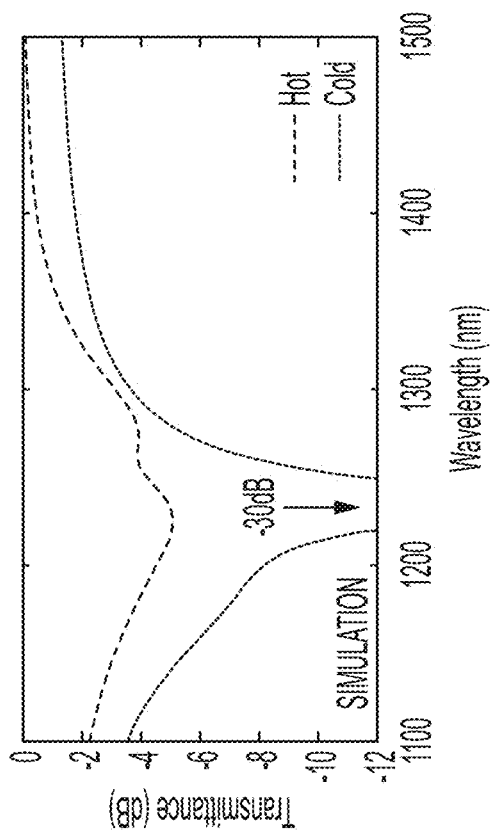
FIGS. 5A-5D show experimental (FIGS. 5A and 5C) and simulated experimental (FIGS. 5B and 5D) performance of a device as described herein.
Figure 5B:
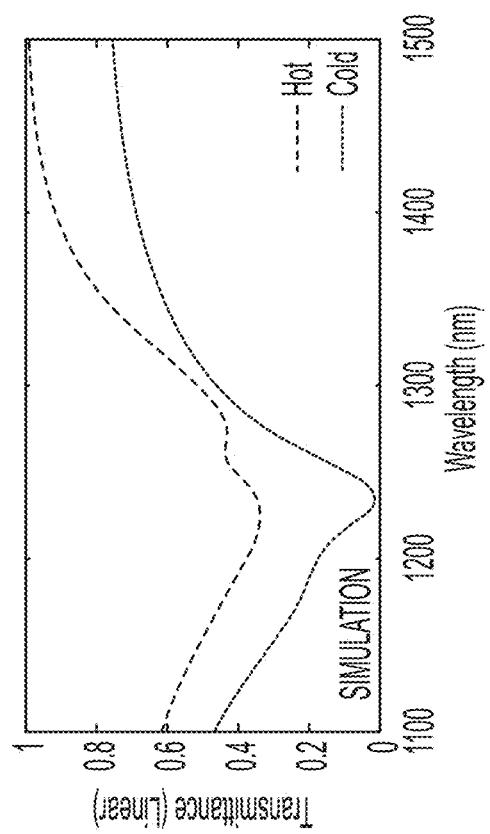
Figure 5C:
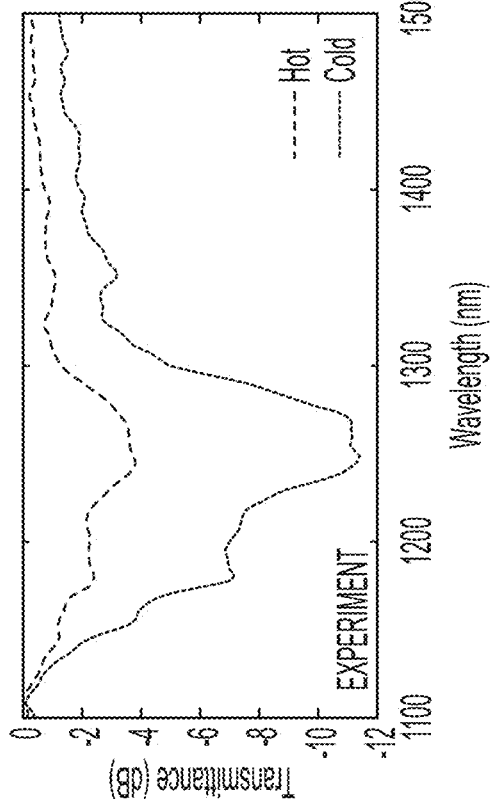
Figure 5D:
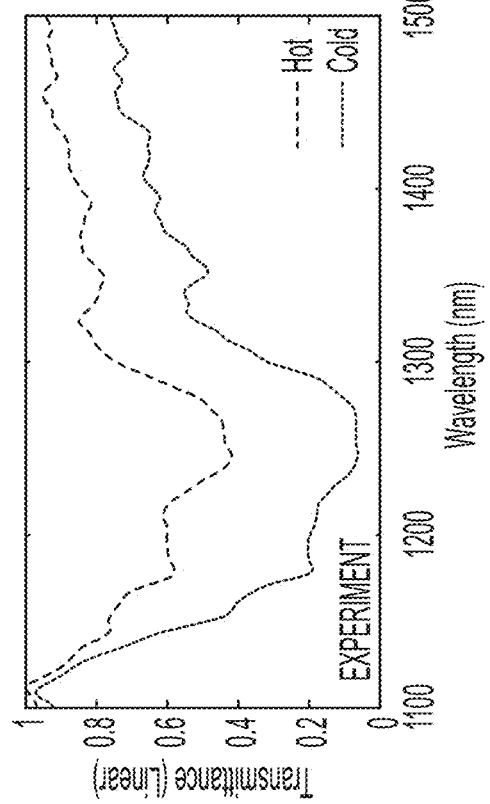

FIG. 4A shows a simulated transmission spectra with semiconducting phase $VO_2$ as a function of film thickness. FIG. 4B shows a simulated transmission spectra with metallic phase $VO_2$. FIG. 4C shows simulated transmission contrast with varying $VO_2$ thickness for the Huygens metasurface-based optical limiter (solid square) and $VO_2$ continuous film on $SiO_2$ substrate (solid circle). The data of the $VO_2$ continuous film is multiplied by a factor of 5 for better clarification. As can be seen in FIG. 4, the off-state exhibits a lower transmittance due to the increased loss in metallic phase $VO_2$. When the thickness is increased to 35 nm, the transmittance contrast begins to decrease, indicating that an optimal $VO_2$ thickness is 30 nm. This value is based on the coupling condition between the ED and MD, as well as the high dispersion of the ENZ. For thicker $VO_2$, though the dimension of the resonators can be modified to retrieve best overlap of ED and MD, the operation wavelength may be tuned away and the contribution from ENZ mode enabled field enhancement may be eliminated. To emphasize the field enhancement from the dielectric resonators, simulations of the transmission on $VO_2$ films were performed, with the same thicknesses given in FIGS. 4A and 4B. Since the films do not benefit from the Huygens mode fields in a nearby resonator, the on-off contrast is reduced by 37.0 dB compared to the metasurface design (FIG. 4C). FIGS. 5A-5D show experimental (FIGS. 5A and 5C) and simulated experimental (FIGS. 5B and 5D) performance of device as described herein.

Figure 6:
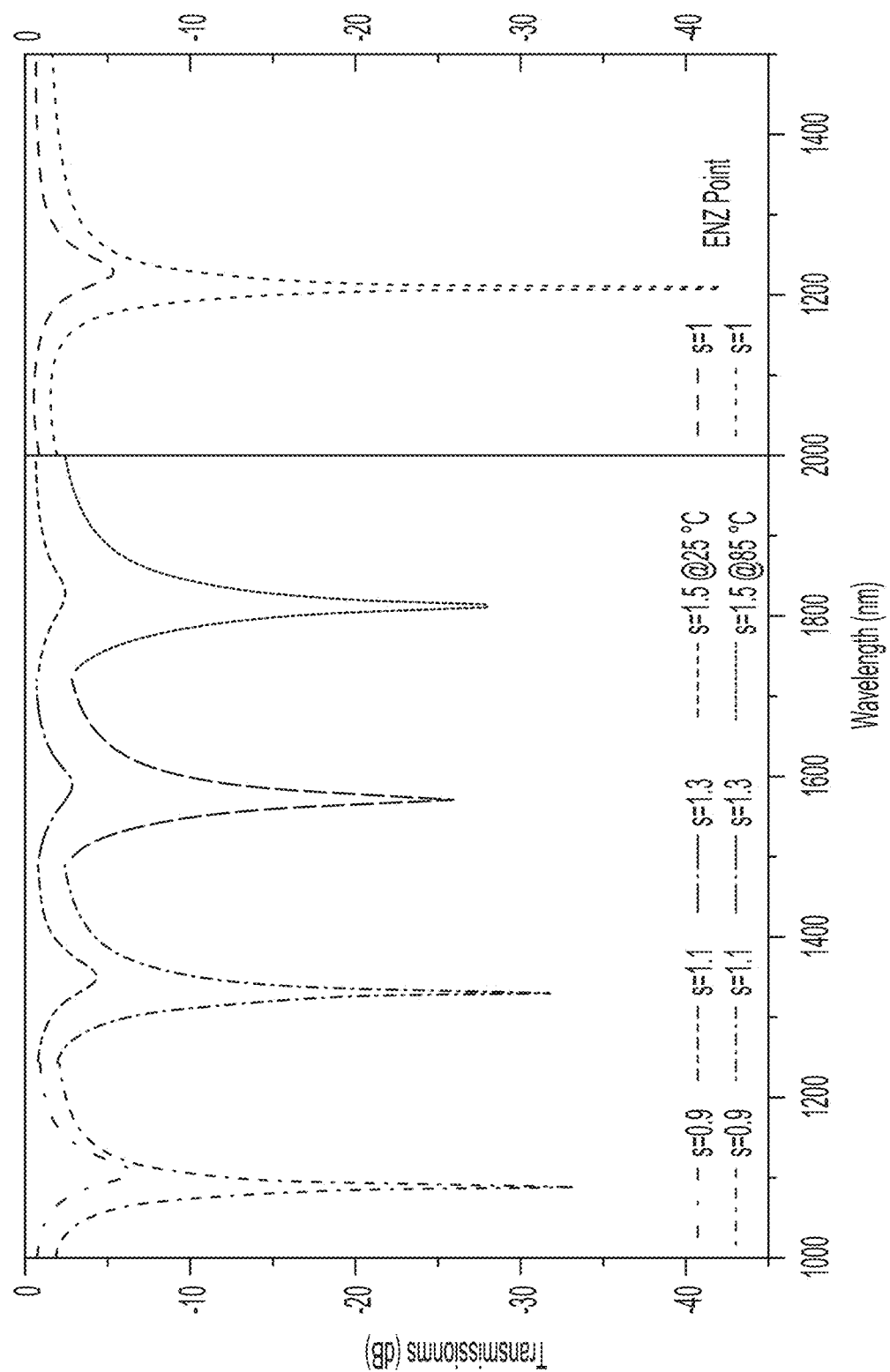
FIG. 6 shows simulated transmission spectra for Huygens metasurface-based optical limiter scaled to different wavelengths.

One advantage of this metasurface-based design is the ability to adjust the working wavelength by tuning the size of the resonators. With the standard carrier concentration used in the exemplary device above, the ENZ point of the $VO_2$ thin films is 1200 nm. Despite the fact that the ENZ point is fixed, it is possible to achieve high transmittance contrast between the on state and the off-state of the device at longer wavelengths where metallic $VO_2$ has larger absorption losses. To explore how this type of metasurface operates at other wavelengths, devices were simulated with unit cell dimensions scaled by a factor of s with the exception of the $VO_2$ thickness, which is held constant at 30 nm. FIG. 6 shows simulated transmission spectra for Huygens metasurface-based optical limiter scaled to different wavelengths. The overall geometry is equally adjusted with a scale s=0.9, 1.1, 1.3 and 1.5 to work near 1064 nm, 1350 nm, 1550 nm, and 1850 nm, respectively. Over 20 dB on-off transmittance contrast is observed for all four scaled metasurfaces, compared to 38.2 dB transmittance contrast for a device with s=1. The decreased contrast for the scaled designs illustrates that the spectral location of the ENZ mode governs the magnitude of field concentration in the $VO_2$ film and controls the cutoff efficiency.

Described herein is a metasurface-based optical limiter working in the near infrared region. To enhance the interaction between the incident light and $VO_2$ thin film, a Huygens mode is created in the supporting Si resonator by overlapping the electric and magnetic Mie dipole modes. By designing the Huygens mode spectrally near the ENZ point of the $VO_2$ film, the field inside the $VO_2$ is enhanced to increase absorptance. By controlling the phase of the $VO_2$ film, the transmittance of the device can be adjusted by tuning the coupling of the ENZ point of the $VO_2$ and the Huygens mode of the resonators. A transmittance contrast of 38.2 dB has been demonstrated experimentally, which exhibited superior performance to a continuous $VO_2$ film of the same thickness. The optical limiter performance has been systemically analyzed using a thermal solver and an intensity threshold of 3.4 kW/cm2 is predicted. This threshold can be adjustable with doping or applied external stress. Additionally, we show that the working wavelength is tunable across the near-IR by altering the scale of the unit cell dimensions. This metasurface-based design serves as a strong alternative for free space or on-chip optical limiters.

While the exemplary embodiment described herein uses $VO_2$ as the phase-change material, an optical limiter according to principles described herein may include other phase-change materials in place or in addition to $VO_2$, including, but not limited to Tin Oxides, Gallium Phosphides, Germanium, Gallium Arsenides, Gallium Nitrides, and/or other phase-change materials with a refractive index of 1.5 or greater. In some embodiments, the refractive index of the phase-change material may be greater than 2. While optical limiters described herein are formed on an Si resonator, other materials may be used in place of the Si to provide an appropriate resonator, such as titanium dioxide, gallium phosphide, gallium nitride, and gallium arsenide.

Optical limiters as described herein may be used in various applications, including, but not limited to, eyewear for protection from laser exposure. This would be appropriate for the military or civilian market. The civilian market could include individuals working with lasers as well as pilots and private security. The optical limiter as described herein can also be used in protecting any camera, machine vision focal plane array, pixel sensor (including single pixel sensors), charge coupled device, or the like. The array configuration can be scaled for larger applications, such as windows, windshields, and the like. Appropriate substrate materials may be chosen according to the application.

A transmissive and all-dielectric optical limiter with great cutoff efficiency using Vanadium Dioxide ($VO_2$) as the active component is disclosed. Vanadium dioxide may be chosen for an optical limiter due to the large contrast in optical constants upon undergoing the semiconductor to metal phase transition. When triggered optically, this transition occurs within 60 fs, making the device suitable for an ultrafast laser environment. In addition, the phase transition threshold is tunable by applying stress or doping; therefore, the device cutoff intensity can be adjusted to fulfill specific requirements.

Optical limiters are designed to limit the intensity of light at high fluences. This is typically done to protect electronics or an individual's eyes from exposure to intense and damaging laser light. In some aspects of the present device, at low intensities the light may pass through the limiter so that it can be recorded or imaged. The device may contain some nonlinear material that will cause the device to become reflective or absorptive once the light fluence reaches a certain threshold. Generally, sacrifices may be made in the low fluence transmission at, or around, the limiting wavelength or in the level to which the device limits the transmission at high fluence. Nonlinear materials may be integrated with artificial materials to form an optical limiter.

In this work we have designed a structured material, hereby referred to as a metasurface, to realize an optical limiter that is both highly transmissive at low fluence while having a large optical density (OD), or low transmission, at high fluence. The metasurface comprises an array of optical resonators that are formed from structuring a dielectric material such as silicon or titanium dioxide. According to and aspect described herein, the metasurface is design by overlapping electric and magnetic dipole resonances. This allows for unity transmission at the optical resonance while still concentrating energy in the resonator material. A thin layer of phase-change media, or any other active media whose optical properties will change at high fluence, is placed on top of the resonator. When fluence reaches a certain level, the active material's properties change causing transmission to significantly dip at the resonance frequency, providing limiting.

In one configuration of the device the active material is designed to work at a wavelength where its electrical permittivity is zero in either the low or high fluence state. This is referred to as the epsilon-near-zero (ENZ) point and allows the use of thinner active media due to field concentration in the active medium. However, operating at the ENZ point is not necessary. Vanadium dioxide (VO2) may be used as the active medium and silicon as the resonator. $VO_2$ undergoes a semiconductor to metal phase transition at ~67° C. which causes a large change in its electrical permittivity. In the current implementation the $VO_2$ will transition to the metallic phase at high fluence due to heating. This transition causes a large increase in absorption and a subsequent dip in the transmission. The low fluence transmission is roughly −5 dB at the resonance frequency with a high fluence transmission less than −40 dB based on at least one contemplated design.

An optical device according to principles described herein may be formed according to known fabrication techniques, including but not limited to, photolithography, electron beam lithography, nanoimprint lithography, self-assembly-based patterning, colloidal synthesis, and screen printing.

A number of embodiments of the disclosure have been described. Nevertheless, it will be understood that various modifications may be made without departing from the spirit and scope of the invention. Accordingly, other embodiments are within the scope of the following claims.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present inven-

What is claimed is:

1. An optical component, comprising:
 a dielectric resonator; and
 a phase-change material on the dielectric resonator, the phase-change material having an optical property having a first characteristic associated with a first material phase and a second characteristic associated with a second material phase,
 wherein an electric dipole of the dielectric resonator and a magnetic dipole of the dielectric resonator are spectrally overlapped at a resonance wavelength.

2. The optical component of claim 1, wherein the dielectric resonator has a cylindrical profile having a height $H_{res}$ and diameter $D_{res}$ and wherein phase-change material has a cylindrical profile having a height $t_{pcm}$ and a diameter $D_{pcm}$, wherein $D_{res}=D_{pcm}$ and the phase-change material is on the dielectric resonator such that a total height $H_{tot}$ of the optical component $H_{tot}=H_{res}+t_{pcm}$.

3. The optical component of claim 1, wherein the dielectric resonator comprises Si and the phase-change material comprises $VO_2$.

4. The optical component of claim 3, wherein the $VO_2$ extends from the surface of the Si a predetermined thickness.

5. The optical component of claim 4, wherein the $VO_2$ has a cylindrical profile having a height $t_{VO2}$ and diameter $D_{VO2}$ and wherein the Si has a cylindrical profile having a height $h_{Si}$ and a diameter $D_{Si}$.

6. The optical component of claim 5, wherein $t_{VO2}2=30$ nm and $h_{Si}=180$ nm and $D_{VO2}=D_{Si}$.

7. The optical component of claim 1, further comprising an insulating substrate wherein the dielectric resonator is on the substrate and the phase-change material is on the dielectric resonator.

8. An optical component, comprising:
 a dielectric resonator; and
 a phase-change material on the dielectric resonator, the phase-change material having an optical property having a first characteristic associated with a first material phase and a second characteristic associated with a second material phase,
 wherein the first characteristic is semiconducting and the second characteristic is reflectivity.

9. The optical component of claim 8, wherein an electric dipole of the dielectric resonator and a magnetic dipole of the dielectric resonator are spectrally overlapped at a resonance wavelength.

10. An optical device having tunable light transmission properties comprising:
 an insulating substrate;
  dielectric resonator structures on the insulating substrate and periodically spaced apart on a surface of the insulating substrate by a predetermined pitch p; and
 a phase-change material structures, each phase-change material structure corresponding to and located on one of the dielectric resonator structures, wherein each of the phase-change material structures has an optical property having a first characteristic associated with a first material phase and a second characteristic associated with a second material phase,
 wherein an electric dipole of the dielectric resonator and a magnetic dipole of the dielectric resonator are spectrally overlapped at a resonance wavelength.

11. The optical device of claim 10, wherein the pitch p is $p_x$ in a first direction the substrate and $p_y$ in a second direction on the substrate.

12. The optical device of claim 11, wherein $p_x=p_y$ and the first direction is substantially perpendicular to the second direction.

13. The optical device of claim 10, wherein each of the dielectric resonators has a cylindrical profile having a height $H_{res}$ and diameter $D_{res}$ and wherein each of the phase-change material structures has a cylindrical profile having a height $t_{pcm}$ and a diameter $D_{pcm}$, wherein $D_{res}=D_{pcm}$ and each of the phase-change material structures is on one of the dielectric resonators such that a total height $H_{tot}$ of an optical component comprising one of the dielectric resonators and one of the phase-change material structures is $H_{tot}=H_{res}+t_{pcm}$.

14. The optical device of claim 10, wherein the dielectric resonator comprises Si and the phase-change material comprises $VO_2$.

15. The optical component of claim 14, wherein the $VO_2$ extends from the surface of the Si a predetermined thickness.

16. The optical device of claim 14, wherein the $VO_2$ has a cylindrical profile having a height $t_{VO2}$ and diameter $D_{VO2}$ and wherein the Si has a cylindrical profile having a height $h_{Si}$ and a diameter $D_{Si}$.

17. The optical component of claim 16, wherein $t_{VO2}=30$ nm and $h_{Si}=180$ nm and $D_{VO2}=D_{Si}$.

18. The optical device of claim 10, wherein the first characteristic is semiconducting and the second characteristic is reflectivity.

* * * * *

UNITED STATES PATENT AND TRADEMARK OFFICE
CERTIFICATE OF CORRECTION

PATENT NO. : 11,209,716 B2
APPLICATION NO. : 16/593551
DATED : December 28, 2021
INVENTOR(S) : Jason G. Valentine et al.

It is certified that error appears in the above-identified patent and that said Letters Patent is hereby corrected as shown below:

On the Title Page

Item (73):
The name of the Assignee reads: Vanderbuilt University
Should now read: Vanderbilt University Signed and Sealed this
Thirty-first Day of May, 2022

Katherine Kelly Vidal
*Director of the United States Patent and Trademark Office*